United States Patent [19]

Hudec

[11] 4,322,226

[45] Mar. 30, 1982

[54] METHOD AND APPARATUS FOR DEGASSING FLUIDS

[76] Inventor: Donald P. Hudec, 5601 Manzanita Ave., Carmichael, Calif. 95608

[21] Appl. No.: 148,838

[22] Filed: May 12, 1980

[51] Int. Cl.³ .............................................. B01D 19/00
[52] U.S. Cl. .......................................... 55/41; 55/55; 55/189
[58] Field of Search ...................... 55/55, 189, 52, 159, 55/39, 40, 41, 43, 46, 164; 210/188, 927; 222/209; 417/472; 128/273; 137/99.5, 101.11, 205.5

[56] References Cited

U.S. PATENT DOCUMENTS

| | | | |
|---|---|---|---|
| 377,099 | 1/1888 | Fowler | 55/189 |
| 2,927,658 | 3/1960 | Slater, Jr. | 55/189 |
| 3,199,511 | 8/1965 | Kulick | 210/927 X |

*Primary Examiner*—Frank A. Spear, Jr.
*Attorney, Agent, or Firm*—Blair, Brown & Kreten

[57] ABSTRACT

A method and apparatus for degassing water wherein water is introduced into a sealed receptacle in the interior of which is disposed a collapsed flexible bag while a vacuum is applied from a vacuum source to degas the introduced water, the bag interior being subsequently vented to the atmosphere and the degassed water removed from the receptacle interior, the bag being permitted to expand to compensate for the vacuum in the receptacle interior during such water removal.

12 Claims, 1 Drawing Figure

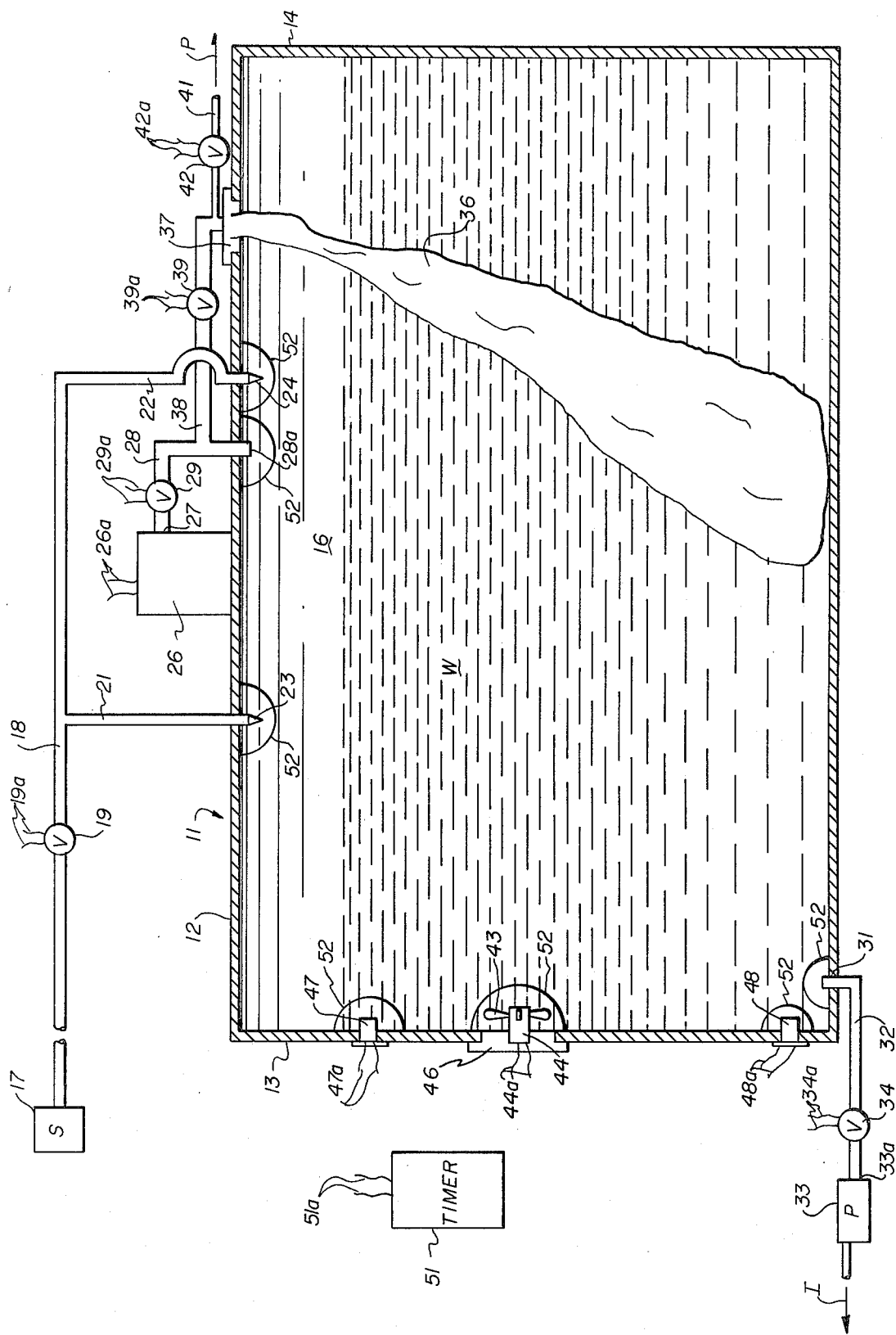

METHOD AND APPARATUS FOR DEGASSING FLUIDS

BACKGROUND OF THE INVENTION

It is well known that water exposed to the atmosphere absorbs air as well as contaminants which might be entrained in the air. While water under these conditions is normally useful for many applications, processes and the like, it presents certain problems or limitations in certain specific processes. For instance, it is well known that in paper making processes, deaeration of the stock is highly desirable in promoting a better overall quality of paper as entrained air in the paper stock tends to produce a cementing affect on the fiber flocks in the stock. U.S. Pat. No. 3,131,117 issued to W. W. Hickey on Apr. 28, 1964 recognizes this problem and proposes a solution. In another area, degassing tap water used in a dialysis machine permits the machine to operate with much greater efficiency. Such a liquid degassifier is shown in U.S. Pat. No. 4,042,351 issued to Aug. 16, 1977 to R. L. Anderson.

In other areas such as steam heating systems, deaeration has been found to be particularly desirable in that inleakage of corrosive gasses as well as the presence of such gasses in make up water produces a deleterious effect on the water and steam lines. Such a vacuum deaerating apparatus is shown in U.S. Pat. No. 2,357,445 issued Sept. 5, 1944 to C. I. Baker.

While such degassing devices produce fairly satisfactory results, they are characterized by certain limitations which have sought to be overcome for prolonged periods. Some of these limitations include the high cost and complexity of such equipment as well as inability to degas water to the desired degree.

SUMMARY AND OBJECTS OF THE INVENTION

Accordingly, a primary object of this invention is to provide a new and novel method and apparatus for degassing fluids such as water which permits complete degasification of the water.

Another object of this invention is to provide a new and novel apparatus for degasifying water which is characterized by a high rate of production and which is extremely simple and inexpensive in construction.

A further object of this invention is to provide a new and novel method of degasifying water which is characterized by a minimum of steps and which permits a fluid such as water to be completely degasified in a relatively short period of time.

Still another object of this ivention is to provide a new and novel apparatus for degasifying water which is completely automatic in operation, which is capable of prolonged use without breakdown and which utilizes readily available component parts.

A still further object of this invention is to provide a new and novel method and apparatus for degasifying water wherein the resulting degasified water is of such purity as to find advantageous uses in a wide variety of applications.

The above-mentioned and other features and objects of the present invention will become more apparent by reference to the following description taken in conjunction with the accompanying drawing.

BRIEF DESCRIPTION OF THE DRAWING

The single FIGURE of the drawing is a diagrammatic view partly in section illustrating the apparatus of the invention by means of which the novel method of the invention is practiced.

DESCRIPTION OF THE PREFERRED EMBODIMENT

Referring now to the single FIGURE of the drawing, there is shown an apparatus constructed in accordance with the invention for degassing a liquid such as water. The apparatus of the single FIGURE includes a sealed receptacle 11, preferably of circular cross-sectional shape having a side wall 12, and end walls 13, 14, defining an interior 16. The apparatus includes means for introducing water into the receptacle interior 16 which, in the specific embodiment, include first conduit means connected to an associated source of water indicated digrammatically by the reference numeral 17. The first conduit means includes a conduit 18 in which is located a solenoid operated valve 19 suitably connected to a source of power by means of conductors 19a. At least one preferably two conduits 21, 22 provided with spray nozzles 23, 24 respectively are connected in communication with the conduit 18 and extend through the receptacle side wall 12 with the nozzles disposed within the upper portion of the receptacle interior 16 in spaced-apart relationship.

The apparatus of the invention also includes means for applying a vacuum to the receptacle interior 16 to degas water introduced into the interior 16 through the nozzles 23, 24 the water within the receptacle interior 16 designated by the letter W. More specifically, the apparatus of the invention includes a vacuum pump 26 of conventional construction having an outlet 27. Second conduit means are provided for communicating the vacuum outlet 27 with the receptacle interior 16 which, in the illustrated embodiment, comprises a conduit 28 having a solenoid operated valve 29 therein connected by means of conductors 29a to a suitable source of power. The conduit 28 includes an open end 28a disposed within the receptacle interior 16 for applying the vacuum to the receptacle interior.

The apparatus of the invention also includes means for removing the water W from the receptacle interior 16 in a degassed condition. More specifically, the receptacle 11 is provided with an outlet 31 in the bottom portion of the receptacle side wall 12 which is connected by fourth conduit means such as a conduit 32 with the inlet 33a of a pump 33 which permits removal of the water W in the direction of the arrow I to a suitable collection area (not shown). The conduit 32 also includes a solenoid operated valve 34 provided with conductors 34a for connecting the valve 34 to a suitable source of power.

Means are disposed within the receptacle interior 16 for compensating for the vacuum in the receptacle interior during the removal of the water W from the interior by the pump 33 to maintain the removed water in a degassed condition. More specifically, a flexible bag 36 of airtight material having an open end 37 is disposed within the receptacle interior 16 as shown with the open end 37 extending outwardly through the receptacle side wall 12 in sealed relationship therewith. Means are provided for communicating the open end 37 with the bag 36 with the vacuum pump 36. In the illustrated embodiment, second conduit means such as a conduit 38 is connected at one end to the conduit 28 and at its other end through a solenoid operated valve 39 with the bag open end 37 as shown. The solenoid operated valve 39 is provided with conductors 39a by means of which the valve 39 is connected to an associated source of power.

Means are also provided for venting the interior of the bag 36 to the atmosphere which, in the illustrated embodiment, comprises third conduit means such as a conduit 41 connected at one end to the conduit 38 communicating with the bag open end 37 and at the other end through a solenoid operated valve 42 to the atmosphere as indicated by the arrow P, the solenoid operated valve 42 is provided with conductors 42a for connecting the solenoid valve 42 with an associated source of power.

The apparatus of the single FIGURE includes agitating means disposed within the receptacle interior 16 for agitating the water W. In the illustrated embodiment, the agitating means comprises an impellor 43 disposed within the receptacle interior 16 and means for rotating the impellor 43 such as a motor 44 is provided preferably supported by means such as a plate 46 in the receptacle end wall 13 as shown.

Means are also provided for sensing the level of the water W in the receptacle interior 16 at a predetermined upper level and at a predetermined lower level. More specifically, an upper sensor 47 which may be any conventional type of sensor is supported in the receptacle end wall 13 and is arranged to be connected by means such as conductors 47a for providing a signal indicating when the predetermined upper level of water W has been reached. Similarly, a sensor 48 is provided in the lower portion of the receptacle end wall 13 having conductors 48a for transmitting the signal sensed at the predetermined lower level of the water W in the receptacle interior 16.

In order to provide for automatic operation of the apparatus of the invention, suitable timing means such as a timer 51 is provided the timer being connected by means of suitable conductors 51a to the various operating components of the apparatus which include the solenoid valves 19, 29, 39, 42, 34 as well as the agitating means or impellor motor 44 and the level sensors 47, 48. It should be understood that although a motor driven impellor 43 is utilized for agitating the water W in the receptacle interior 16 it is within the scope of the invention to utilize an ultrasonic generator of conventional construction the ultrasonic output of which produces an agitation throughout the water W in the well known manner. Also, in order to avoid damage to the spray nozzles 23, 24 the conduit outlet 28a the level sensors 47, 48 and the impellor 43 a protective dome 52 provided with suitable apertures therein so as to permit normal operation of the assoicated unit as provided.

In the operation of the invention, at the beginning of operation of the apparatus of the invention, with the timer 51 activated, solenoid operated valves 19, 29, 39, 42 and 34 are closed. As the timer 51 cycles, solenoid operated valve 19 is opened to permit water from source 17 to flow through conduits 18 and 21, 22 to the spray nozzles 23, 24 injecting water in spray form within the a receptacle interior 16. At the same time, solenoid operated valve 29 opens and vacuum pump 26 started to apply a vacuum to the receptacle interior 16 through conduit opening 28a. At this time, solenoid valve 39 is opened for a brief period to evacuate the interior of bag 36 so that the bag collapses. As water is sprayed into the receptacle interior 16 by means of the nozzles 23, 24, the vacuum pump 26 continues to operate so that the sprayed water from nozzle 23, 24 is broken up reducing surface tension and releasing gasses from the water into the vacuum.

As the water W in the receptacle interior 16 reaches the high level sensing device 47, the signal produced by the sensing device 47 initiates actuation of the impellor drive motor 44 so that the impellor 43 rotates to agitate the water W. At this time, solenoid actuated valve 19 is closed and no further water is introduced into the receptacle interior 16. During the agitation of the water W by the impellor 43 the vacuum pump 26 continues to apply a vacuum to the receptacle interior 16 until the timer 51 completes its cycle after which the vacuum pump 26 is stopped. Subsequently, solenoid operated valve 29 closes and solenoid operated valve 42 opens venting the interior of the bag 36 to atmosphere.

Water pump 33 is then activated and solenoid operated valve opened to pump degassed water to storage or to a point of use. As the water W is pumped out of the receptacle interior 16 the bag 36 expands to fill the volume within the receptacle interior left as the degassed water is removed to compensate for the vacuum. Thus, degassed water under vacuum conditions is removed without being exposed to the atmosphere.

The water pump 33 continues to pump to remove water from the receptacle interior 16 until the water reaches the low level corresponding to the position of the lower sensing device 48. The sensing of this low level by the sensing device 48 produces a signal which causes the pump 33 to be deactivated and all of the solenoid operated valves then close so that the entire cycle discussed above may be repeated. At the end of each cycle, the bag 36 is filled with air and completely displaces the water and vacuum in the receptacle interior 16. In addition to preventing damage to the units protected by the dome 52 the flexible bag 36, as it expands, is thereby prevented from being perforated by those parts projecting into the receptacle interior 16.

Having thus described the preferred embodiment of the invention it should be understood that numerous structural modifications and adaptations may be resorted to without departing from the spirit of the invention.

What is claimed is:

1. An apparatus for degasing a liquid such as water comprising, in combination, a sealed receptacle having an interior, means for introducing the liquid into a lower portion of said receptacle interior from an upper portion thereof, means for applying a vacuum directly to said receptacle interior to degas the liquid introduced therein, means for removing the liquid from said receptacle interior in a degassed condition and means disposed in said receptacle interior during the removal of the liquid from said interior by said removing means to maintain said removed liquid in a degassed condition.

2. An apparatus in accordance with claim 1 wherein said means for compensating for the vacuum in said receptacle interior comprises a flexible bag of airtight material having an interior and an open end, means for communicating said bag open end with said vacuum applying means and means for venting said bag interior to the atmosphere.

3. Apparatus in accordance with claim 2 wherein said means for introducing liquid into said receptacle interior comprises at least one nozzle disposed in said receptacle interior to provide spray and means for communicating said at least one nozzle with an associated supple of liquid externally of said receptacle whereby surface tension of the liquid in said receptacle is reduced and the spray atomizes the liquid.

4. Apparatus in accordance with claim 3 including agitating means disposed within said receptacle interior for agitating the liquid in said receptacle interior.

5. Apparatus in accordance with claim 4 wherein said agitating means comprises an impellor positioned for immersion in the liquid introduced within said receptacle interior and means for rotating said impellor.

6. Apparatus in accordance with claim 5 wherein said means for applying a vacuum to said receptacle interior comprises a vacuum pump having an outlet and first conduit means for communicating said vacuum pump outlet with said receptacle interior.

7. Apparatus in accordance with claim 6 wherein said means for communicating said bag open end with said vacuum applying means comprises second conduit means communicating at one end with said pump outlet and at the other end with said bag open end.

8. Apparatus in accordance with claim 7 wherein said means for venting the interior of said bag to the atmosphere comprises third conduit means communicating at one end with said bag open end and at the other end with the atmosphere.

9. Apparatus in accordance with claim 8 wherein said means for removing degassed liquid from said receptacle interior comprises a pump having an inlet and wherein said receptacle is provided with an outlet and fourth conduit means for connecting said receptacle outlet with said pump inlet.

10. Apparatus in accordance with claim 9 wherein each of said first, second, third and fourth conduit means and said means for introducing water into said receptacle interior include a solenoid operated valve and including timing means for operatively conditioning all of said solenoid operated valves in a predetermined sequence.

11. Apparatus in accordance with claim 10 including means for sensing the level of the liquid in said receptacle interior at a predetermined upper level and a predetermined lower level and means for operatively connecting said level sensing means to said timing means.

12. A method of degassing a liquid such as water comprising the steps of, positioning a flexible bag of airtight material in a receptacle interior, evacuating the interior of said bag to collapse said bag, introducing water into said receptacle interior to a predetermined level, applying a vacuum to said receptacle interior during said water introducing step to degas said water, removing said degassed water from said receptacle interior, and venting said bag interior to the atmosphere to permit said bag to expand during said water removing step to compensate for the vacuum in said receptacle interior.

* * * * *